(12) United States Patent
Castorina et al.

(10) Patent No.: US 7,630,003 B2
(45) Date of Patent: Dec. 8, 2009

(54) METHOD AND SYSTEM FOR PROCESSING VIDEO SIGNALS, FOR EXAMPLE FOR DISPLAYING ON A SMALL SIZED COLOR DISPLAY, AND CORRESPONDING COMPUTER PROGRAM PRODUCT

(75) Inventors: Alfio Castorina, Santa Venerina (IT); Sebastiano Battiato, Acicatena (IT); Mirko Guarnera, Gela (IT); Filippo Vella, Casa Santa Erice (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1101 days.

(21) Appl. No.: 10/732,186

(22) Filed: Dec. 10, 2003

(65) Prior Publication Data

US 2004/0174441 A1 Sep. 9, 2004

(30) Foreign Application Priority Data

Dec. 10, 2002 (IT) .......................... TO2002A1072

(51) Int. Cl.
*H04N 9/73* (2006.01)
*H04N 9/083* (2006.01)
(52) U.S. Cl. ..................... 348/223.1; 348/274
(58) Field of Classification Search .............. 348/223.1, 348/229.1, 241, 280, 222.1; 382/167, 300
See application file for complete search history.

(56) References Cited

U.S. PATENT DOCUMENTS

| | | | | |
|---|---|---|---|---|
| 3,971,065 A | | 7/1976 | Bayer | |
| 5,768,609 A | * | 6/1998 | Gove et al. | ..................... 712/11 |
| 5,822,606 A | * | 10/1998 | Morton | ......................... 712/16 |
| 5,917,556 A | * | 6/1999 | Katayama | ..................... 348/655 |
| 6,236,433 B1 | * | 5/2001 | Acharya et al. | ............. 348/273 |
| 6,954,228 B1 | * | 10/2005 | Acharya et al. | .......... 348/223.1 |
| 6,958,772 B1 | * | 10/2005 | Sugimori | ................. 348/222.1 |
| 2003/0156205 A1 | * | 8/2003 | Sasaki et al. | ............. 348/222.1 |

OTHER PUBLICATIONS

Mancuso et al., "An Introduction to the Digital Still Camera Technology," ST Journal of Research, Dec. 2001, pp. 1-9, vol. 2, No. 2.

* cited by examiner

*Primary Examiner*—Lin Ye
*Assistant Examiner*—Mekonnen Dagnew
(74) *Attorney, Agent, or Firm*—Lisa K. Jorgenson; Seed IP Law Group PLLC; E. Russell Tarleton

(57) ABSTRACT

A method of processing digital video signals produced by a sensor that are to be presented on a viewfinder, the method involving: a first pair of processing operations for scaling and color interpolation; and a second pair of processing operations for the formation of a color matrix and for white balancing. The operations of at least one, and preferably of both of the pairs of processing operations are executed in a single step. The operation of white balancing is moreover performed only for one frame out of K frame in the frame sequence. The preferential application is in the construction of viewfinders for videocameras and digital still cameras.

34 Claims, 3 Drawing Sheets green
red
blue

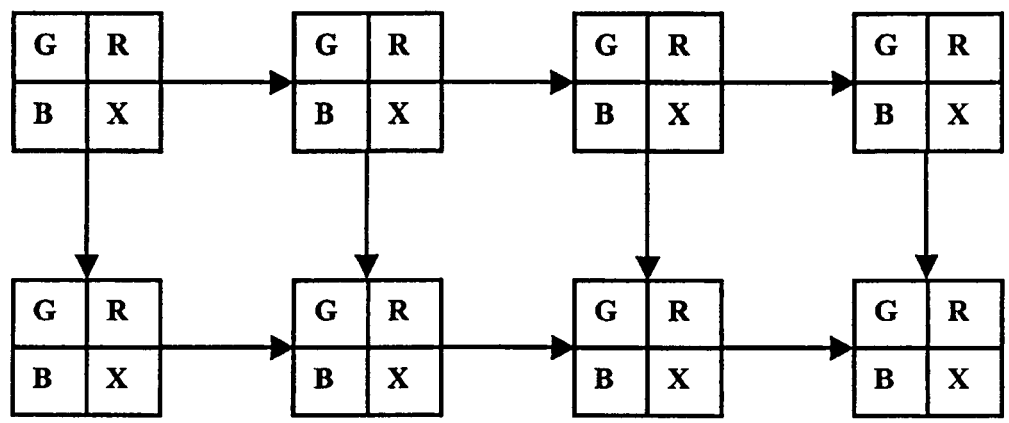
FIG. 4
FIG. 5
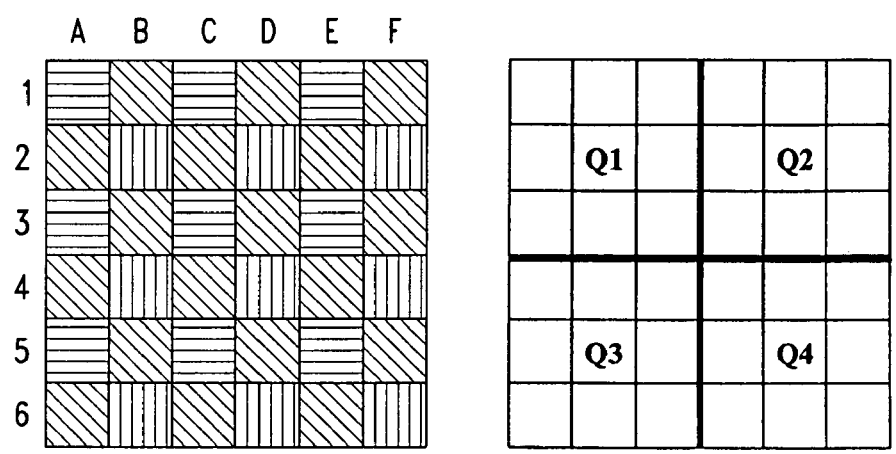
FIG. 6

$$[R'\ G'\ B'] = [R\ G\ B] * \overbrace{\begin{pmatrix} Gr & 0 & 0 \\ 0 & Gg & 0 \\ 0 & 0 & Gb \end{pmatrix}}^{\text{WB MATRIX}} * \overbrace{\begin{pmatrix} m11 & m12 & m13 \\ m21 & m22 & m23 \\ m31 & m32 & m33 \end{pmatrix}}^{\text{MATRIXING MATRIX}}$$

$$\underbrace{\begin{pmatrix} c11 & c12 & c13 \\ c21 & c22 & c23 \\ c31 & c32 & c33 \end{pmatrix}}_{\text{COMBINED MATRIX}}$$

METHOD AND SYSTEM FOR PROCESSING VIDEO SIGNALS, FOR EXAMPLE FOR DISPLAYING ON A SMALL SIZED COLOR DISPLAY, AND CORRESPONDING COMPUTER PROGRAM PRODUCT

BACKGROUND OF THE INVENTION

1. Field of the Invention

The present invention relates to techniques for processing video signals, such as are used in systems for image acquisition, in particular in the sector of consumer-electronics devices, that acquire images by means of digital sensors, such as CCDs or CMOS sensors, including reduced size color displays, and corresponding computer program.

2. Description of the Related Art

In the applications to which reference has been made above, the input data are normally acquired according to a Bayer configuration or pattern (see in this connection U.S. Pat. No. 3,971,065). To obtain the final image it is necessary to apply a reconstruction algorithm, the purpose of which is to exploit as far as possible the information acquired by the sensor to obtain the best possible image. For a general discussion of the problems linked to this approach, useful reference may be made to the work of M. Mancuso and S. Battiato: "An introduction to the digital still camera technology", ST Journal of System Research, Vol. 2, No. 2, pp. 1-9, December, 2001.

The block diagram of FIG. 1 represents the typical configuration of the image-acquisition system present, for example, in a digital videocamera or still camera of general production.

The reference number 10 designates the image sensor, i.e., the physical sensor (for example, CCD/CMOS).

The corresponding output signal is usually organized according to a Bayer pattern of the type presented in FIG. 2.

The information contained in this type of image corresponds to a sub-sampling of a color image. In the pattern, each pixel contains information regarding just one color "channel" (red, green, blue). All the color channels regarding a pixel can be reconstructed by means of interpolation of the information regarding the individual channels.

The reference number 12 in the diagram of FIG. 1 designates a module that performs a pre-processing of the data supplied by the sensor 10 with a view to subsequent treatments. In particular, comprised in this module are a block for white balancing, a block for construction of the color matrix, a block for range correction, etc.

The block 14 performs the reconstruction of the color image from the Bayer pattern. The corresponding output is represented by an image in which the chromatic information has been reconstructed, i.e., in which each pixel has the information regarding each channel, and the missing information has been reconstructed by the module 14.

The corresponding image signal can then be transferred to a module 16 functioning as a compression module (typically according to the JPEG standard) with a view to storage in a memory 18. The memory in question can be constituted either by the physical medium on which the video signals are stored (videocassettes, CD-ROMs, etc.) or by a memory associated to a display unit (not illustrated).

In the case of a videocamera or similar device (e.g., digital still camera) the signal at output from the sensor 10 is supplied—in addition to the "main" processing chain illustrated previously—also to an auxiliary processing chain having the function of processing an image designed to be presented on a viewfinder that enables the user to recognize the characteristics of the image that he is photographing.

For the above purpose, the signal arriving from the sensor 10 is supplied to a module designated by 20 which processes it in such a way as to enable presentation of the signal on a display or viewfinder designated by 22.

The corresponding refresh factor must be sufficiently high to cause the image presented on the viewfinder to correspond effectively to the images photographed of filmed and treated by the main processing chain comprising the elements designated by 12 to 18.

The viewfinder 22 must therefore present a somewhat high refresh rate (frame rate), but the image presented need not have a very high quality, since it primarily has the purpose of functioning as preview of the final image, interpolated as much as possible.

At the same time it is important that the image presented on the viewfinder 22 should provide a sufficiently faithful representation of the characteristics of the image proper in terms of color balancing and construction of the corresponding matrix. However, since in the final analysis it is an auxiliary or additional function, it is desirable to proceed so that the function of processing implemented in the module 20 is not excessively burdensome from the computational standpoint or from the standpoint of circuit complexity or both.

BRIEF SUMMARY OF THE INVENTION

The disclosed embodiments of the present invention provide a solution to meet these needs that includes in one embodiment a processing method presenting the characteristics recalled specifically in the ensuing claims, and to the corresponding processing system, which can be implemented both in the form of a dedicated processor and in the form of a general-purpose processor (e.g., DSP) adequately programmed. In this perspective, the invention also relates to the computer-program product that can be directly loaded into the memory of a digital processor and contains portions of software code for implementing the method according to the invention when the product is run on a computer.

An embodiment of the invention operates on video sequences with Bayer matrix of the color filter-array (CFA) type. The fact of working on original CFA data enables savings in terms of resources, time, and space, which is particularly important for real-time applications.

The solution according to this embodiment favors rapidity and recourse to a small number of operations, albeit maintaining a good quality of the final image, in particular obtaining a reasonable compromise in terms of quality perceived by the end user (in terms of definition, saturation, and tone of the color, and frame rate) and computational complexity.

This result is achieved taking into account the fact that the parallel chain for processing and storage of the images (modules 12 to 18 of FIG. 1) aims at obtaining the maximum level of quality with a complete spatial and field resolution. The typical liquid-crystal display (LCD) used in devices of a consumer type for application as viewfinders employ just one fraction (for example, ⅓ or ¼) of the original resolution of the sensor, this applying also to the resolution in terms of depth of field linked to the number of bits per pixel.

The solution described herein adapts the processing to the final conditions and conditions of observation immediately after the process of acquisition. In particular, instead of applying the scaling function from the Bayer pattern to the RGB color planes—after complete processing, and hence with full resolution—and then performing a scaling to the final display conditions, the solution described herein adapts the entire processing line adequately right from the start.

Results demonstrate the effectiveness of the solution above all as regards the possibility of achieving considerable savings in terms of frame-rate processing, albeit maintaining a high quality of the final image perceived.

More specifically, the solution described herein envisages recourse to an implementation of a simple type and hence "light" in terms of computational burden, in particular by combining together the processing operations that can be performed in a single step. In addition, in the presence of data that change slowly, there is envisaged execution of the single processing for a number of successive frames.

Specifically, in the currently preferred embodiment of the invention, there is envisaged: performing in a single step the function of scaling and of interpolation of the color; evaluating the white balancing taking into account only one frame out of K frames, and not all the frames; moreover the gains are estimated on one part of the sub-sampled image; performing in a single step the operations of white balancing and correction of the chromatic components (color matrixing); implementing the range correction by means of a look-up table (LUT); and improving the quantization, using the improved-grey-scale (IGS) algorithm.

In accordance with a method for processing digital video signals of the present invention, in which the digital video signals are produced by a sensor, the method includes subjecting the digital video signals to a first pair of processing operations of scaling and color interpolation; and to a second pair of processing operations of formation of a color matrix and white balancing, and the operations of at least one of the first and second pair of processing operations are executed in a single step.

In accordance with another aspect of the foregoing embodiment, the method includes organizing the digital video signals in sets of subsequent frames, each set comprising a given number of frames, and performing the white balance on just one frame for each set. Ideally, the operation of white balancing is performed only for one frame out of K frames in a frame sequence of the digital video signals. Furthermore, implementing a range correction is provided by means of a look-up table.

In accordance with another embodiment of the invention, a system for processing digital video signals is provided, the digital video signals produced by a sensor and presented ideally on a display device, such as a viewfinder. The system includes a first set of modules for the execution of operations of scaling and of color interpolation; and a second set of modules for the execution of operations of formation of a color matrix and of white balancing. Ideally, the module of at least one of the first and second set of modules is integrated so as to execute the corresponding operations in a single step.

In accordance with another aspect of the foregoing embodiment, the system is configured for operating on digital video signals in sets of subsequent frames, each set comprising a given number of frames, ideally K frames, and comprising a module for white balancing that is configured for performing the white balancing on just one frame for each set of K frames in the frame sequence of the digital video signals.

In accordance with another aspect of the foregoing embodiment, a method is provided that includes a first pair of processing operations that are a scaling operation and a color interpolation operation; and subjecting the digital video signals to a second pair of processing operations that are a color matrix formation operation and a white balancing operation, and the operations of at least one of the first and second pair of processing operations are performed in a signal step.

In accordance with another embodiment of the invention, a method of processing digital video signals is provided that includes performing in a single step the functions of scaling and of interpolation of color; and performing in a single step the operations of white balancing and color matrixing.

BRIEF DESCRIPTION OF THE DRAWINGS

The invention will now be described, purely by way of non-limiting example, with reference to the annexed drawings, in which:

FIGS. 4 to 8 illustrate schematically various processing functions that can be implemented in accordance with the invention.

DETAILED DESCRIPTION OF THE INVENTION

Figure 3:
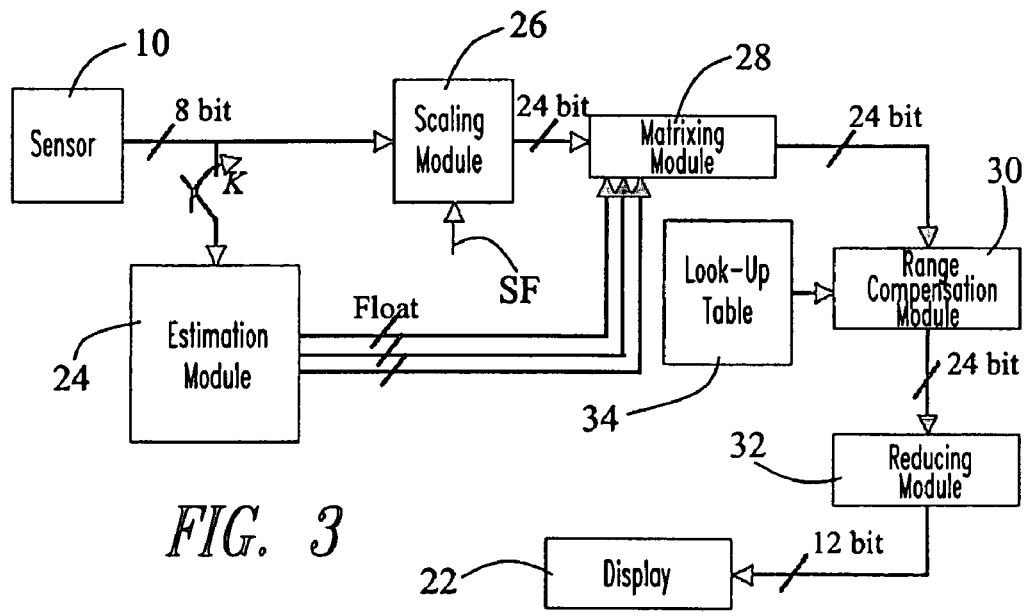
FIG. 3 illustrates, in the form of a block diagram, an embodiment of the invention.

In the block diagram of FIG. 3, the reference 10 once again indicates the sensor that supplies at output starting image data in Bayer format, for example on eight bits.

Figure 1:
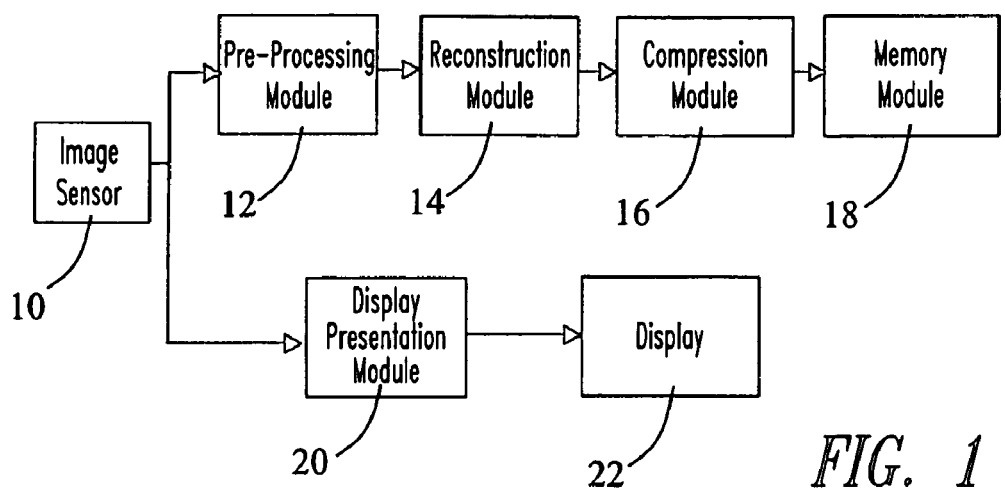
FIGS. 1 and 2 have already been described previously.
Figure 2:
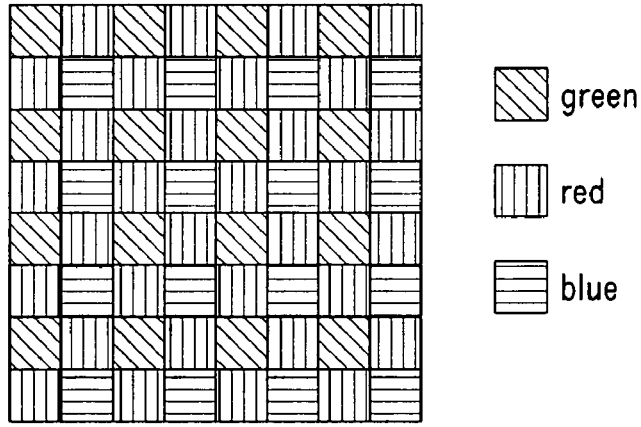

The corresponding display, such as a viewfinder (for example, an LCD viewfinder) is again designated by 22. For immediate reference, it may then be assumed that the complex of the modules indicated in the figure with the reference numbers 24 to 34 correspond basically to the block 20 of FIG. 1.

More precisely, in the block diagram of FIG. 3, the reference number 22 designates the display control unit (of a known type) designed to drive a display of this sort. In what follows it will be assumed, purely by way of example, that said control unit is designed to operate on twelve bits.

The reference 24 designates a first block or module designed to execute a function of estimation of the values necessary for automatic white balancing (WB) on the data coming from the sensor 10.

Considering that usually there do not occur very significant variations in brightness between successive frames, the module 24 performs the corresponding estimation not on all the images, but rather on just one image out of K images (where K is, for example, 8).

The data corresponding to the video images are then treated in a module 26 that carries out in just one step the functions of scaling (by a scaling factor SF fixed externally) and interpolation.

In a currently preferred embodiment of the invention, the range of possible variation of the scaling factors is usually quite small, there being envisaged, for example, three possible factors equal to 3, 4 and 5.

The colors of the image that have undergone scaling are then subjected to correction (by adapting the corresponding spectrum to the sensitivity of the human eye) with a matrixing operation performed in a module 28 according to the coefficients received from the estimation block 24.

Since the operation performed by the module 28 is in itself a function of a point type, like the WB estimation, it is possible to combine the two operations in a single step.

The reference 30 designates the function of range compensation performed (according to criteria in themselves known) in order to adapt the colors to the characteristics of response of the display driven by the unit 22. The range-compensation function is performed according to of the data contained in a look-up table (LUT) designated by the reference 34.

Finally, a module designated by 32 reduces the color planes with an effect that is antagonistic to formation of false boundaries.

Just to provide an example (of course without thereby limiting in any way the scope of the invention) the data at output from the module 28 are usually organized on 24 bit, this format being preserved also after the range-compensation function has been executed. The module 32, by reducing the chromatic planes, reduces, instead, the format to 12 bits, a value that is used by the control unit 22. The final number of bits is not in any way limiting and it can be applied for a reduction of the bits in general.

Passing on to a more detailed examination of the characteristics of the various blocks represented in FIG. 3, it will be recalled in the first place that the role of the white-balancing function (module 24) is to compensate possible dominant hues (casts) linked to problems of illumination of the image. The purpose is to eliminate any possible undesired casts in the case of images taken under conditions of illumination with light different from white light.

As is illustrated in greater detail in FIG. 4, the solution described herein envisages splitting the Bayer pattern into blocks of four pixels (each containing one pixel R, one pixel B and two pixels G) and considering for processing purposes only one pixel for each channel. This means that one of the two pixels G, i.e., the pixels G designated by X in FIG. 4, is not considered.

Of course the symbols R, B, and G correspond, respectively, to red, blue and green.

In a preferred way, the functions outlined in what follows are carried out.

For each pixel in each image block:

the channel energies (ces) are calculated, ignoring the clipped components (i.e., the components greater than a pre-set saturation point) which could represent erroneous data in the white-balancing operation, by multiplying the energy of the pixels by the minimum pixel energy (min_pwe) amongst the pixels considered in the block and then by accumulating the channel energies (ces):

ces=Acc(related_pwe.min_pwe);

there are then calculated normalized channel energies (nces) for the pixels of each channel with respect to the maximum energy of the channel (max_ce):

nce=max_ce/related_ce next, the channel gains are set equal to the normalized channel energies (nces):

gains=related_nce;

finally, the channel gains are applied to all the channel pixels:

pixels_value=pixels_value.related_gain.

In order to accelerate execution of the procedure, since the illumination is normally distributed uniformly on the image, the treatment is carried out by sub-sampling blocks of four pixels in the vertical and horizontal directions.

Considering the data pattern, the step of sampling in terms of number of pixels must be equal to (2N).

Represented in FIG. 5 are the blocks of an image used for gain estimation. Considering the sub-sampling referred to above, between one block and the next other pixels are present which are not considered for the purpose of the specific computation. In particular, between one block and the next (whether in the horizontal direction or in the vertical direction) 2N pixels are discarded.

The reason for resorting to an even number of pixels is to consider a block having the position of the pixel G above the blue and to the left of the red. Only if an even displacement on the Bayer pattern is considered is the same arrangement of the pixels obtained.

In addition, since it is reasonable to expect that in the majority of the video sequences considered the conditions of illumination will vary gradually in passing from one frame to another, the channel gains are updated only once in a while, for example, once every K frames.

Assuming a sequence of M frames of size H×V, if the two techniques of acceleration are combined, only (M/K)×(H×V)/(16×N$^2$)] frames are considered.

In the above formula, K indicates every so many frames that the gains are recalculated, N is the sampling step (which is of the 2N type), and M is the number of frames. As regards the formula, it may be noted that, in the case of absence of sampling we have (H×V)/(2×2) blocks, whereas if the frames are sampled their number is equal to ((H×V)/(2×2))/(2×N×2×N)=(H×V)/(16×N×N), a quantity that is finally to be multiplied by the fraction (M/K) of frames considered.

The purpose of the function of scaling and color interpolation implemented in the module 26 is to create a colored image starting from the data coming from the sensor 10.

During color interpolation a processing aimed at a subset of pixels is performed, thus making it possible to obtain in a single step a scaled image in RGB format.

In order to treat different display resolutions, different scaling factors are considered. If the scaling factors are varied, it is necessary to change also the size of the kernel of the interpolation operator.

With reference to a matrix structure of the Bayer type, highlighted in FIG. 6, in the case where the scaling to be carried out is by a factor 3, from each quadrant $Q_i$ (i=1 ... 4), a set of three values R G B is obtained, by obtaining from a set of 9 elements a single output pixel and performing a scaling by a factor 3 both in the horizontal and in the vertical directions.

The above figure highlights all the possible cases of arrangement of the intensity of the chromatic channels in the case of scaling equal to 3.

The formulae for scaling and simultaneously interpolating the missing channels for the four target pixels (each deriving from a quadrant $Q_i$) are the following (see FIG. 6):

For Q1 (the central pixel is red):

Blue1=(*A*1+*C*1+*A*3+*C*3)/4, Green1=(*B*1+*A*2+*C*2+*B*3)/4, Red1=*B*2

For Q2 (the central pixel is green, case A):

Green2=(*D*1+*F*1+*D*3+*F*3)/4, Blue2=(*E*1+*E*3)/2, Red2=(*D*2+*F*2)/2

For Q3 (the central pixel is green, case B):

Green3=(*A*1+*C*1+*A*6+*C*6)/4, Blue3=(*A*5+*C*5)/2, Red3=(*B*4+*B*6)/2

For Q4 (the central pixel is blue):

Red4=(*D*4+*F*4+*D*6+*F*6)/4, Green4=(*E*4+*D*5+*F*5+*E*6)/4, Blue4=*E*5.

Figures 7, 8:
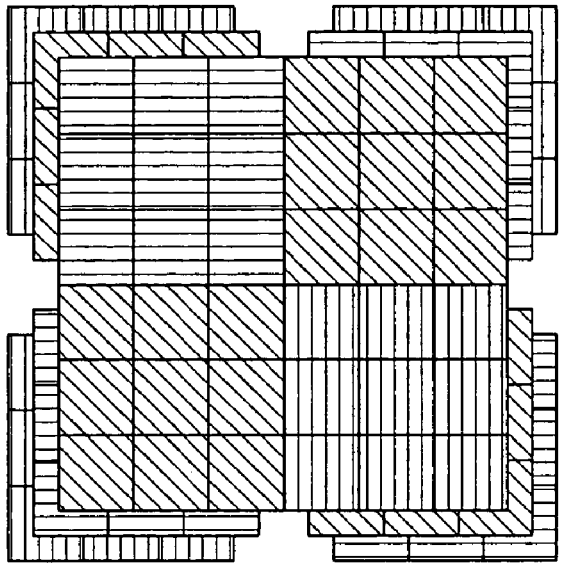

For each of these four cases the result is given by a pixel in the RGB format. FIG. 7 represents the quadrants with the three components of color reconstructed according to the central pixel.

In actual fact only one pixel per quadrant is supplied at output.

For the case of scaling by a factor 4 (for example to pass from VGA to 160×20) and the case of scaling by a factor 5 (for example, from VGA to 128×96) basically similar solutions are used, but with kernels of size 5×5.

Passing to the modules 28 (and 24) it will be recalled that the role of the color matrix is to improve color rendering and saturation in the image. In particular, the purpose is to correct the spectral sensitivity of the image sensor in a coordinated way with the chromatic characteristics of the display, taking into account the characteristics of the human eye.

This result is obtained by manipulating the coefficients of the table of the color matrix to be applied to each RGB colored pixel.

Reasoning in deliberately simplified terms, but without departing from reality, the operation in question is a simple matrix product between the channels of the input colors of a correction matrix, the coefficients of which are fixed with reference to the specific characteristics of the display.

The solution illustrated herein combines the correction/white balancing (module 24) and the aforesaid matrixing operation (module 28) in a single step, multiplying the matrix applied to the module 28 by a diagonal matrix. The elements of a diagonal matrix are simply the channel gains calculated as described previously.

The execution of this combined operation is illustrated in FIG. 8, where WB Matrix designates precisely the aforesaid diagonal matrix, and Matrixing Matrix designates the matrix the coefficients of which take into account the characteristics of the display. The resulting matrix is designated by Combined Matrix.

In principle, the values coming from the module 24 should undergo clipping (in the output field) prior to being subjected to matrixing. However, possible errors are directly masked by the subsequent chromatic quantization.

The function of range correction (compensation) implemented by the module 30 corresponds simply to the application of the values of the look-up table 34, in a situation in which the i-th element of the table contains the value.

$$255 \times (i/255)^{i/a}$$

As regards quantization (or truncation), reference may be made to a function that applies an improved grey scale (IGS).

If a simple quantization of a channel from 8 bits to 4 bits is considered, the reduced information thus obtained can generate a certain number of false boundaries and hence a substantially worse image.

The solution described herein envisages however avoiding a brutal truncation of the values so as to prevent formation of new edges in the image.

Prior to truncation, added to each value is a factor of pseudo-random noise. In this way, it is possible to obtain that pixels that are close to one another having the same value will end up having slightly different final values.

The noise is determined by the least significant bits of the sum of the value of the pixels and the noise estimated previously. The tests conducted by the present applicant show that the solution described herein enables images of high quality to be obtained reducing considerably the computational burden and the implementation burden as a whole.

In summary, the main advantages of the solution described herein are linked to the factors outlined in what follows.

The gain values for white balancing (WB) are determined on the basis of a sub-sampled sensor output. Preferably, the sub-sampling factor is even. The gain estimation is not performed for each frame, but rather once every K frames. When no new values are calculated, the white-balancing block WB uses the last saved value. The functions of scaling and interpolation of the color are implemented in a single step. Likewise, white balancing WB is applied simultaneously to calculation of the color matrix. In general, executing a redundant processing with respect to the pre-set qualitative objectives is avoided.

Of course, without prejudice to the principle of the invention, the details of implementation and the embodiments may vary widely with respect to what is described and illustrated herein, without thereby departing from the scope of the present invention. For example, it may be envisaged that only part of the processing operations illustrated herein as being performed in a single step is implemented according to this modality. Accordingly, the invention is not limited except as by the appended claims and the equivalents thereof.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

The invention claimed is:

1. A method for processing digital video signals produced by a sensor and designed to be presented on a viewfinder, the method comprising subjecting the digital video signals to:
   a first pair of processing operations comprising a scaling and color interpolation; and
   a second pair of processing operations comprising the formation of a color matrix and white balancing,
   wherein the operations of at least one of said first and said second pair of processing operations are executed in a single step, and said operations of formation of a color matrix and of white balancing executed by a digital processor in a single step lead to the application to said digital video signals of a combined processing matrix, said combined processing matrix resulting from the product of a matrix of formation of the color matrix and of a diagonal matrix, and elements of the diagonal of said diagonal matrix identifying white-balancing weights.

2. The method of claim 1, comprising:
   organizing said digital video signals in sets of subsequent frames, each set comprising a given number of frames; and
   performing said white balancing on just one frame for each set.

3. The method of claim 1, comprising the operation of estimating gain values for performing said white balancing, said gain values estimated on a sub-sampled part of the corresponding image.

4. The method, of claim 1, comprising the operation of subjecting said digital video signals, prior to supply to said viewfinder, to an operation of range compensation, said operation of range compensation conducted by applying to said digital video signals coefficients of compensation drawn from a look-up table.

5. The method of claim 1, comprising the operation of subjecting said digital video signals, prior to supply to said viewfinder, to an operation of reduction of the color planes.

6. The method of claim 5, wherein said operation of reduction of the color plane is performed after said operation of range compensation.

7. The method of claim 1, wherein said operation of white balancing is performed prior to said operations of scaling and color interpolation.

8. The method of claim 1, comprising:
   organizing the pixels of said digital video signals in blocks comprising pixels of different color channels, said blocks comprising, for at least one color channel, a plurality of pixels, and taking into account, in the context of each block, just one pixel for each color channel.

9. The method of claim 8, applied to digital video signals organized according to a Bayer pattern, wherein said blocks of pixels comprise four pixels of which are one red pixel, one blue pixel and two green pixels and in that just one of said green pixels is taken into account.

10. The method of claim 1, comprising the operation of organizing the pixels of said digital video signals in blocks comprising pixels of different color channels, and the operations of:
a) calculating normalized channel energies for the pixels of each channel with respect to the maximum channel energy;
b) calculating channel gains in proportion to the channel tilts with respect to the normalized channel energies; and
c) applying the channel gains to all the channel pixels.

11. The method of claim 1, wherein said operations of scaling and of color interpolation performed in a single step lead to a sub-sampling of said video signals during the color interpolation.

12. The method of claim 1, comprising the operation of selectively varying the scaling factor for adapting it to different display resolutions of said viewfinder, and modifying accordingly the dimensions of kernel of the interpolation operator.

13. The method of claim 5, wherein said operation of reduction of the color planes involves the steps of:
adding to each signal value a corresponding value of pseudorandom noise; and
subjecting the result of said addition to truncation.

14. The method of claim 13, wherein said value of pseudorandom noise is obtained from the least significant bits of the sum of the preceding pixel value and the preceding noise value.

15. A system for processing digital video signals, that are produced by a sensor and are presented on a viewfinder, the system comprising:
a digital processor with a memory having stored thereon:
a first set of modules for the execution of operations of scaling and of color interpolation; and
a second set of modules for the execution of operations of formation of a color matrix and of white balancing, and wherein the module of at least one of said first and said second sets of modules is integrated so as to execute the corresponding operations in a single step, and said integrated module for execution in a single step of said operations of formation of a color matrix and of white balancing is configured for applying to said digital video signals a combined processing matrix, said combined matrix resulting from the product of a matrix of formation of the color matrix and of a diagonal matrix, the elements of the diagonal of said diagonal matrix identifying white-balancing weights.

16. The system of claim 15, configured for operating on digital video signals in sets of subsequent frames, each set comprising a given number of frames, and comprising a module for white balancing configured for performing said white balancing on just one frame for each set.

17. The system of claim 15, comprising a module for white balancing configured for estimating gain values for performing said white balancing, said gain values estimated on a sub-sampled part of the corresponding image.

18. The system of claim 15, comprising a compensation module for performing on said digital video signals, prior to supply to said viewfinder, an operation of range compensation, said compensation module having associated therewith a look-up table for storage of the compensation coefficients to be applied to said digital video signals.

19. The system of claim 15, comprising a module for elimination of false boundaries for subjecting said digital video signals, prior to supply to said viewfinder, to an operation of reduction of the color planes.

20. The system of claim 18, wherein said module for elimination of false boundaries is situated downstream of said compensation module.

21. The system of claim 15, wherein that said white-balancing module is situated upstream of said scaling and interpolation-interpolation integrated module.

22. The system of claim 15, wherein said white-balancing module is configured for:
organizing the pixels of said digital video signals in blocks comprising pixels of different color channels, said blocks comprising, for at least one color channel, a plurality of pixels; and
taking into account, in the context of each block, just one pixel for each color channel.

23. The system of claim 22, wherein said white-balancing module is configured for operating on digital video signals organized according to a Bayer pattern, said blocks of pixels comprising four pixels, of which are one red pixel, one blue pixel and two green pixels, and wherein there is taken into account just one of said green pixels.

24. The system of claim 15, wherein said white-balancing module is configured for organizing the pixels of said digital video signals in blocks comprising pixels of different color channels and for performing on these signals the operations of:
a) calculating normalized channel energies for the pixels of each channel with respect to the maximum channel energy;
b) calculating the channel gains in proportion to the so-called channel tilts with respect to the normalized channel energies; and
c) applying the channel gains to all the channel pixels.

25. The system of claim 15, wherein said integrated module that performs said operations of scaling and of color interpolation performed in a single step is configured for sub-sampling said video signals during color interpolation.

26. The system of claim 15, wherein said scaling and color-interpolation module is configured for selectively varying the scaling factor in order to adapt it to different display resolutions of said viewfinder, by modifying accordingly the dimensions of kernel of the interpolation operator.

27. The system of claim 19, wherein said module for elimination of false boundaries is configured for:
adding to each signal value a corresponding value of pseudorandom noise; and
subjecting the result of said addition to truncation.

28. The system of claim 27, wherein said module for elimination of false boundaries is configured for obtaining said value of pseudorandom noise from the least significant bits of the sum of the preceding pixel value and the preceding noise value.

29. A computer program product directly loadable into the memory of a digital processor and comprising software code portions for performing the method of claim 1 when said product is run on a computer.

30. A method of processing digital video signals generated by a sensor, comprising:
subjecting the digital video signals to a first pair of processing operations that comprise a scaling operation and a color interpolation operation; and subjecting the digital video signals to a second pair of processing operations comprising a color matrix formation operation and a white balancing operation, wherein the operations of at least one of the first and second pair of processing operations are performed in a signal step, and said operations of formation of a color matrix and of white balancing executed by a digital processor in a single step lead to the application to said digital video signals of a combined processing matrix, said combined processing matrix resulting from the product of a matrix of formation of the color matrix and of a diagonal matrix, and elements of the diagonal of said diagonal matrix identifying white-balancing weights.

31. The method of claim 30, wherein the operations of the first and second pair of operations are executed simultaneously.

32. The method of claim 30, wherein the operation of white balancing is performed only for one frame out of K frames in a frame sequence of the digital video signals.

33. The method of claim 32, comprising presenting the output of the first and second pair of processing operations to a display device.

34. A method of processing digital video signals, comprising:

performing in a single step the functions of scaling and of interpolation of color; and performing in a single step the operations of white balancing and color matrixing, and said operations of formation of a color matrix and of white balancing executed in a single step lead to the application to said digital video signals of a combined processing matrix, said combined processing matrix resulting from the product of a matrix of formation of the color matrix and of a diagonal matrix, and elements of the diagonal of said diagonal matrix identifying white-balancing weights.

* * * * *

UNITED STATES PATENT AND TRADEMARK OFFICE
CERTIFICATE OF CORRECTION

PATENT NO. : 7,630,003 B2  Page 1 of 1
APPLICATION NO. : 10/732186
DATED : December 8, 2009
INVENTOR(S) : Castorina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1731 days.

Signed and Sealed this

Second Day of November, 2010

David J. Kappos
*Director of the United States Patent and Trademark Office*